US008033997B2

(12) United States Patent
Fiasca et al.

(10) Patent No.: US 8,033,997 B2
(45) Date of Patent: Oct. 11, 2011

(54) INTERDIGITATED GEOMETRY TRANSDUCER FOR OPTIMIZING THE IRRADIATED ACOUSTIC BEAM

(75) Inventors: Danilo Fiasca, Casale Monferrato (IT); Giosuè Caliano, Casale Monferrato (IT); Alessandro Caronti, Casale Monferrato (IT); Vittorio Foglietti, Casale Monferrato (IT); Elena Cianci, Casale Monferrato (IT); Massimo Pappalardo, Casale Monferrato (IT)

(73) Assignee: Esaote S.p.A,, Casale Monferrato (AL) (IT)

( * ) Notice: Subject to any disclaimer, the term of this patent is extended or adjusted under 35 U.S.C. 154(b) by 1119 days.

(21) Appl. No.: 11/154,577

(22) Filed: Jun. 17, 2005

(65) Prior Publication Data
US 2006/0007045 A1 Jan. 12, 2006

(30) Foreign Application Priority Data
Jun. 18, 2004 (IT) .............................. RM2004A0300

(51) Int. Cl.
*A61B 8/14* (2006.01)
(52) U.S. Cl. ......................... 600/459; 600/407; 600/437
(58) Field of Classification Search ........... 600/407–480
See application file for complete search history.

(56) References Cited

U.S. PATENT DOCUMENTS 5,576,880 A * 11/1996 Chang .......................... 359/305
6,352,510 B1 * 3/2002 Barabash et al. ............. 600/443

OTHER PUBLICATIONS

Oralkan et al., "Volumetric Ultrasound Imaging Using 2-D CMUT Arrays", IEEE Transactions on Ultrasonics, Ferroelectrics, and Frequency Control, vol. 50, No. 11, Nov. 2003, pp. 1581-1594.*

* cited by examiner

*Primary Examiner* — Brian Casler
*Assistant Examiner* — Nasir Shahrestani
(74) *Attorney, Agent, or Firm* — Buchanan Ingersoll & Rooney PC

(57) ABSTRACT

The invention relates to an ultrasonic transducer comprising a plurality of micro-cells, arranged in an array having M rows and N columns, and driving electronic means apt to connect in parallel to each other said micro-cells so as to form at least two sub-groups of said micro-cells, the micro-cells of each sub-group being connected in parallel to each other, at least one column of said array comprising micro-cells belonging to at least two different adjacent sub-groups, so that a radiation emitted in a direction perpendicular to the array columns by said at least one column has a phase that is intermediate between the phases of said at least two different adjacent sub-groups.

14 Claims, 15 Drawing Sheets

Configuration 3 element N
element N+1
element N+2
element N+3

Phase φ$_n$  Phase φ$_{n+1}$  Phase φ$_{n+2}$  Phase φ$_{n+3}$

Configuration 3

- element N
- element N+1
- element N+2
- element N+3

Configuration 4

- element N
- element N+1
- element N+2
- element N+3

INTERDIGITATED GEOMETRY TRANSDUCER FOR OPTIMIZING THE IRRADIATED ACOUSTIC BEAM

The present invention concerns an innovative solution for reducing diffraction lobes (or grating lobes) of multielement ultrasonic transducers, in particular capacitive silicon micromachined transducers (CMUT: Capacitive Micromachined Ultrasonic Transducer) used in echography for medical diagnostics.

First, a short introduction to ultrasonic imaging principles and concepts, such as focusing, side lobes and grating lobes, and presently used probes, will be given. Finally, the idea which is the subject of this specification will be illustrated, which idea comprises a new geometrical configuration of the elements of linear and phased array transducers such that it significantly reduces the undesired grating lobes.

Presently available echographic probes belong to different categories, each of which is used in specific diagnostic situations: single element transducers, mechanical scanning transducers, annular array transducers, linear array transducers, convex array transducers, phased array transducers.

Transducers which will be considered in the following are linear and phased array transducers.

These transducers are formed by a large number, typically 64 or 128, of rectangular piezoelectric elements placed side by side.

FIG. 1 shows a linear array transducer constituted by 16 elements having length L. The dimensions characterizing such an array are: the width w of the elements and the distance d between centers of adjacent elements. Both these dimensions must be of the order of the irradiated acoustic wavelength, while the length L must satisfy the relationship $L \gg \lambda$. In the Figures, as well as in the following, z indicates the axis perpendicular to the transducer plane, x indicates the axis perpendicular to the elements, and y indicates the axis parallel to the elements.

Single element transducers generate a fixed focus beam allowing good-quality images to be obtained only in the focal zone.

Dynamic focusing allows a considerable increase of the side resolution of the echographic image along with a higher concentration of energy in a desired specific point.

The fundamental feature of a transducer is its radiation pattern, that describes the spatial coverage of the irradiated energy. Under ideal conditions, the individual elements are completely decoupled from each other; assuming that they vibrate as pistons on a rigid support, according to the diffraction theory the far field radiation pattern is given by the product of an element factor $D_e(\theta)$ and an array factor $D_a(\theta)$:

$$H(\theta) = D_e(\theta) \times D_a(\theta) = \frac{\sin\left(\frac{\pi \omega}{\lambda}\sin(\theta)\right)}{\frac{\pi \omega}{\lambda}\sin(\theta)} \times \frac{\sin\left(N\frac{\pi d}{\lambda}(\sin(\theta) - \sin(\theta_0))\right)}{N\sin\left(\frac{\pi d}{\lambda}(\sin(\theta) - \sin(\theta_0))\right)}$$

where $D = N \cdot d$ with N being the number of elements.

The element factor represents the filed irradiated by the single element having width w; the array factor describes the response of an array of point-like elements, taking account of periodicity (elements are repeated with step d), finite size of aperture D, and beam deflection angle $\theta_0$. In fact, the beam may be deflected (operation called steering) by applying appropriate phase delays to the elements.

FIG. 2 shows an example of radiation pattern for a 16-element transducer with ratio $w/\lambda$ equal to 2 and a ratio $w/d$ equal to 0.8 and $\theta_0 = 0$.

The main lobe is at $\theta = 0$. It is accompanied by side lobes. The radiation pattern is replicated for $\sin(\theta) = \pm \lambda/d$, although with a lower amplitude since it is multiplied by the element factor. These replicas are called diffraction or grating lobes, they are similar to those occurring at $\theta = 0$, and they are due to constructive interferences.

The width of the main lobe depends on the ratio $\lambda/D$, while its amplitude depends on N.

FIG. 3 shows the radiation pattern of the previous 16-element array in the case when a deflection (steering) of 15 degrees is made rightwards. It may be observed that the main lobe has been shifted rightwards and its amplitude has been decreased because of the modulation made by the element factor. In the same way the grating lobe has been shifted toward the radiation pattern center, and its amplitude has been increased.

The grating lobes constitute a serious limitation to the image intelligibility because they create a replica of it in a different spatial position.

The grating lobes not only limit the array work frequency, but also the acoustic beam deflection angle. In fact, since their presence is related to the factor $\lambda/d$, they approach the main lobe and their amplitude increases when frequency increases, because the transducer whole response is modulated by the element factor. Due to the same reason, the ratio of the main lobe amplitude to the grating lobe amplitude decreases when the beam deflection angle increases (see FIG. 3).

It is therefore an object of the present invention to reduce the diffraction lobes (grating lobes) of multielement ultrasonic transducers, in particular CMUT transducers.

It is therefore specific subject matter of the present invention an ultrasonic transducer comprising a plurality of micro-cells, arranged in an array having M rows and N columns, and driving electronic means apt to connect in parallel to each other said micro-cells so as to form at least two sub-groups of said micro-cells, the micro-cells of each sub-group being connected in parallel to each other, at least one column of said array comprising micro-cells belonging to at least two different adjacent sub-groups, so that a radiation emitted in a direction perpendicular to the array columns by said at least one column has a phase that is intermediate between the phases of said at least two different adjacent sub-groups.

Each sub-group of micro-cells substantially operates as an element, whereby at least two adjacent elements form a geometry of at least partial reciprocal penetration into each other.

Preferably according to the invention, M and N may be not less than 3. Advantageously according to the invention, N may be not less than M.

Always according to the invention, at least one sub-group may comprise at least one column of said micro-cells.

Still according to the invention, said at least one column may comprise a sequence of micro-cells in alternate rows belonging to two different adjacent sub-groups.

Furthermore according to the invention, said array may include two or more columns, which are intermediate between a first and a second sub-group different from and adjacent to each other, said two or more intermediate columns comprising micro-cells belonging to the first and to the second sub-group, so that the number of micro-cells belonging to the first sub-group in said two or more columns gradually decreases passing from the first sub-group to the second sub-group.

Always according to the invention, at least one column of said array may be incomplete, i.e. it may comprise a number of micro-cells less than M.

Still according to the invention, said at least one incomplete column may be placed at an end of said array.

Furthermore according to the invention, the number N of columns of said array may be an involution of 2 ($N=2^n$).

Always according to the invention, said driving electronic means apt to connect said micro-cells in parallel to each other may be at least partially controlled by an external logic unit.

Still according to the invention, said driving electronic means may be apt to dynamically connect said micro-cells in parallel to each other, so that said at least two sub-groups of said micro-cells have a composition variable in time.

Furthermore according to the invention, said driving electronic means apt to connect said micro-cells in parallel to each other may be at least partially predefined.

Always according to the invention, said driving electronic means apt to connect said micro-cells in parallel to each other may comprise short-circuited electrical connections.

Still according to the invention, said driving electronic means may be apt to connect said micro-cells in parallel to each other so as to form at least three sub-groups of said micro-cells.

Furthermore according to the invention, said plurality of said micro-cells may comprise one or more CMUT cells.

Always according to the invention, said plurality of said micro-cells may comprise one or more piezoelectric cells.

The present invention will now be described, by way of illustration and not by way of limitation, according to its preferred embodiments, by particularly referring to the Figures of the enclosed drawings, in which.

In the Figures, alike elements are indicated by the same reference numbers.

Figure 1:
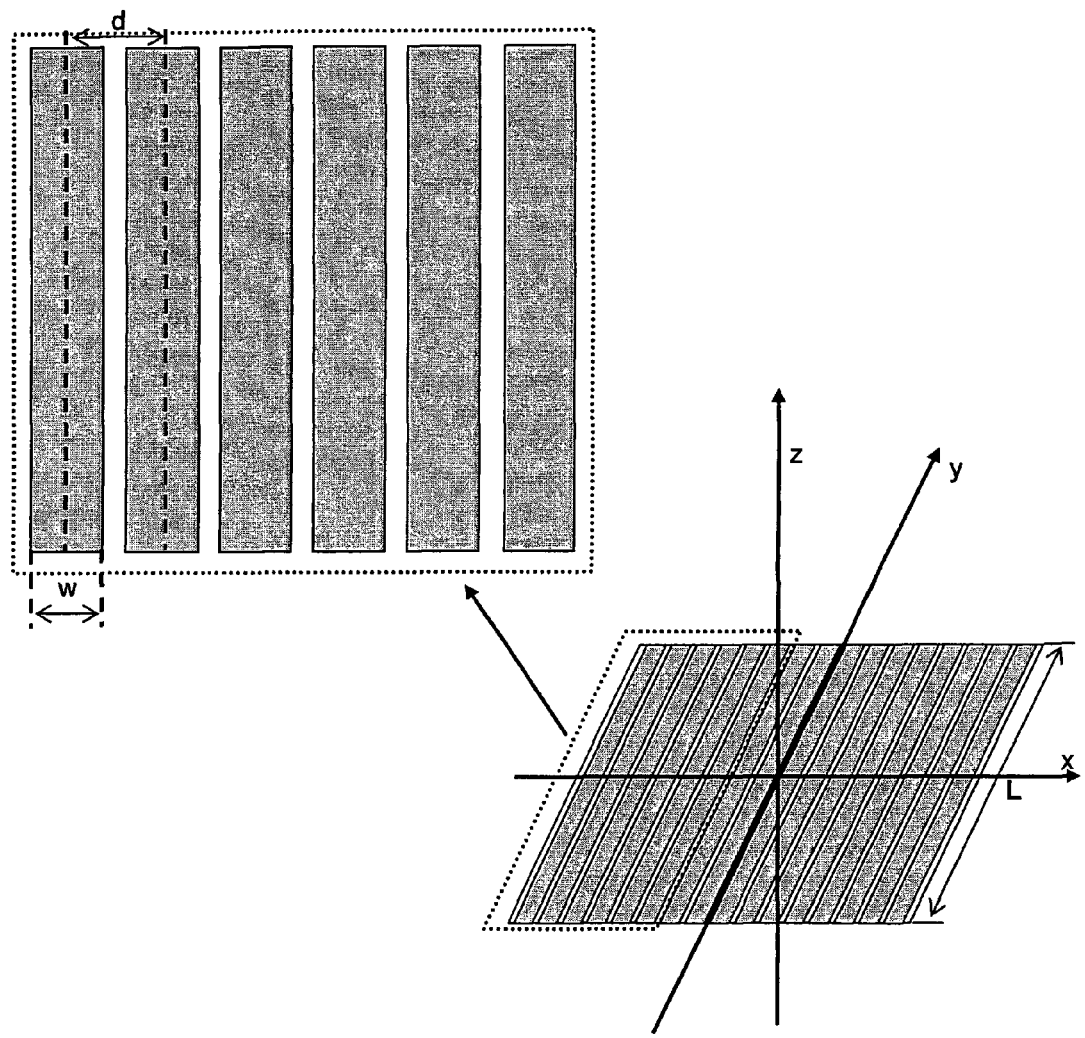
FIG. 1 shows a linear array transducer.
Figure 2:
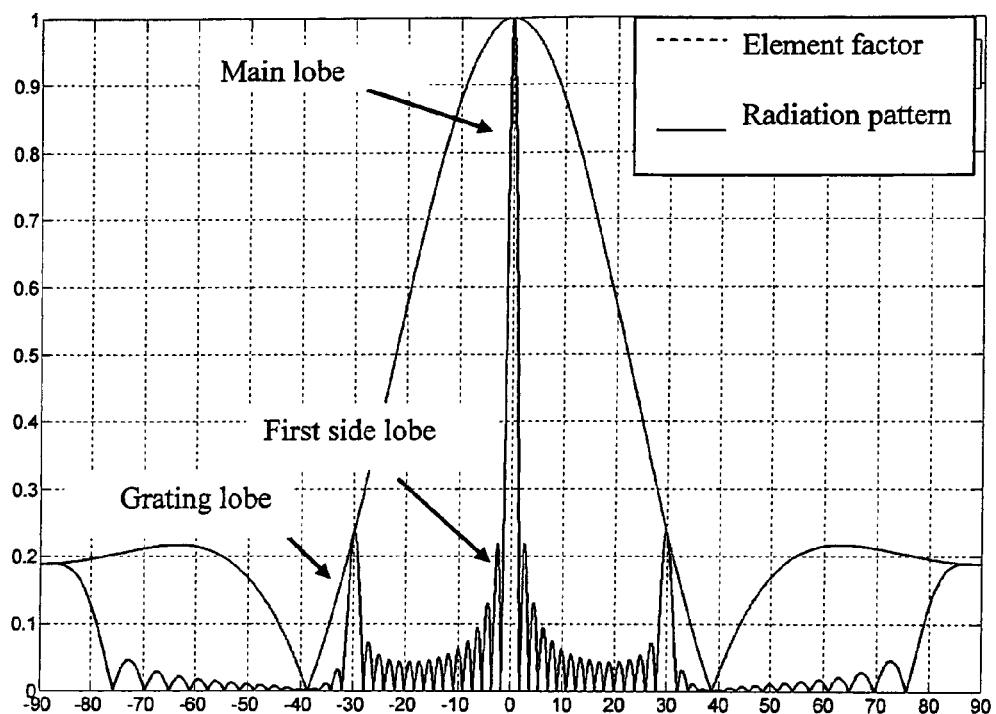
FIG. 2 shows a radiation pattern for a 16-element transducer with ratio w/λ equal to 2 and a ratio w/d equal to 0.8, wherein the dotted line is the element factor.
Figure 3:
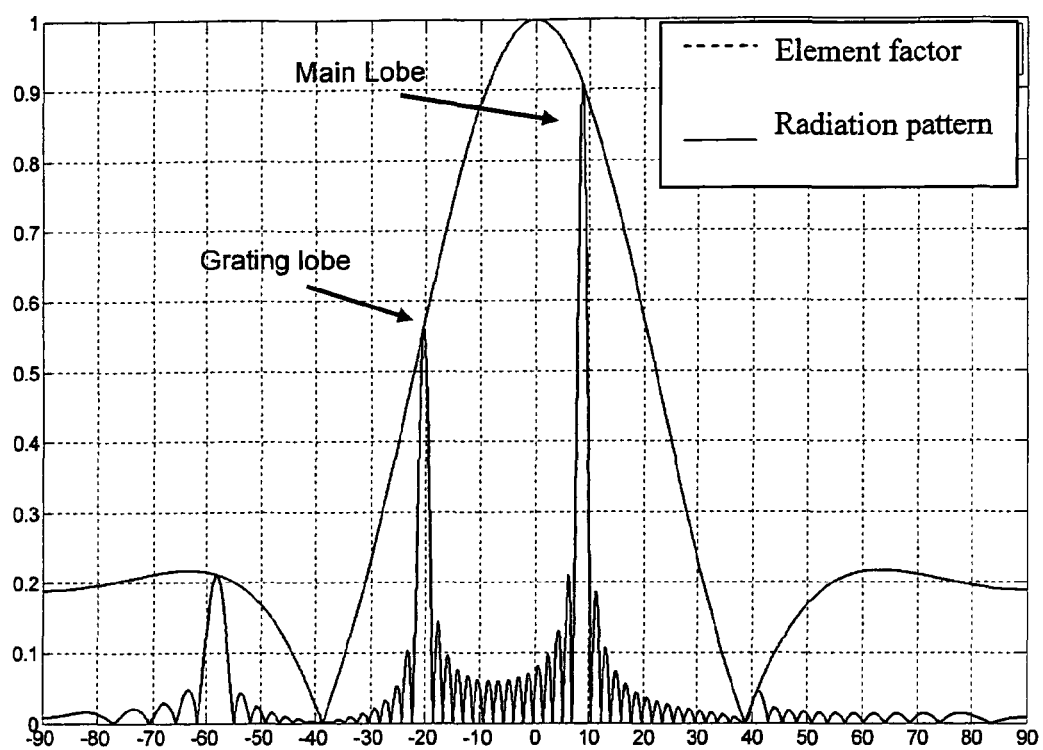
FIG. 3 shows a radiation pattern for a 16-element transducer with ratio w/λ equal to 2 and a ratio w/d equal to 0.8, in case of a 15-degrees steering, wherein the dotted line is the element factor.

It is now shown how, thanks to a new configuration of the elements, possible thorugh CMUT technology, it is possible a significant reduction of the grating lobes.

CMUT transducers are micromachined silicon capacitive ultrasonic transducers; they are based on the principle of the electrostatic transduction. The base element of these devices is a capacitive micro-cell having a fixed electrode and a movable one (membrane); by applying an electrical signal to the suitably biased cell, the electrostatic force modulation is transduced in a membrane vibration with a consequent generation of an ultrasound wave in the surrounding environment. Vice versa, if an ultrasonic wave is incident on the suitably biased membrane, the membrane vibrates producing a variation of the capacitance and hence an electric signal. Each element of such an array is constituted by a large number of these capacitive micro-cells electrically connected in parallel. In order to obtain work frequency in the ultrasonic field (1-10 MHz), the size of membranes is of the order of tens of microns. The large number of cells allows to obtain an adequate sensitivity.

Since each array element made through CMUT technology is constituted by a very large number of micro-cells connected in parallel, the element itself may be configured according to an arbitrary geometry by using as base unit the individual micro-cell which has size lower than the wavelength of the emitted radiation. This characteristic is used in the present invention for reducing the undesired grating lobes.

The phenomenon of the grating lobes is caused by the discretization of the transducer in a certain number N of elements, i.e. by the spatial sampling of the acoustic field ad it is very similar to the well known phenomenon of "aliasing" occurring in the time domain. More in particular, grating lobes arise because of the discretization of the phase (or delay) distribution imposed to the transducer in order to make focusing and deflection of the beam.

There is no "aliasing" phenomenon for any deflection angle only if the distance d spacing the centers of the elements satisfies the relationship $d \leq 0.25 \lambda$, i.e. if a sufficiently dense sampling is carried out. This condition for no grating is very restrictive since, in order to obtain a highly collimated main lobe, i.e. a high side resolution, it is necessary a transducer aperture $D = N \cdot d \gg \lambda$; consequently, for satisfying both conditions, N must be very large, and this entails a large number of electronic channels capable to operate the desired delays and hence a high cost of the equipment.

For instance, with an aperture $N \cdot d = 12$ mm, at the typical frequency of 3.5 MHz ($\lambda$; 0.4 mm), a main lobe aperture angle $\theta^* = \arcsin(\lambda/N \cdot d) = \arcsin(0.4/12) = 2°$ is obtained, which allows a sufficiently collimated beam. The condition for no grating lobes imposes a distance d between elements given by $d = 0.25\lambda = 0.1$ mm, and hence a number N of elements given by $N = 12$ mm/0.1 mm $= 120$ and thus a large number of electronic channels.

The base idea of the present invention aims at reducing the number of element necessary for minimizing the grating lobes by creating a virtual intermediate phase between an element and the adjacent element, only acting on the element geometry. The virtual phase introduced between the element N and its adjacent one N+1 is obtained by vectorially summing the signal applied to the element N $$S_N = A_N \sin(\omega t + \phi_N)$$

which may be considered as having a reference phase $\phi_N = 0$, and the signal applied to the element N+1

$$S_{N+1} = A_{N+1} \sin(\omega t + \phi_{N+1}).$$

In the case when $A_N = A_{N+1}$, the sum signal $S_N + S_{N+1}$ has a phase $\gamma$ with respect to the reference that is given by $$\tan \gamma = \frac{\sin(\varphi_{N+1})}{1 + \cos(\varphi_{N+1})} \text{ from which } \gamma = \varphi_{N+1}/2;$$

the phase of the sum of the two signals is an intermediate one between the phase difference between them.

In order to create this intermediate phase is sufficient to interdigitate the elements, i.e. to employ elements having a geometric shape such that there is a partial reciprocal penetration zone between two successive elements. The radiation emitted by this zone has a phase that is intermediate between the ones of the two elements since the vectorial sum of the two contributions is carried out by the same propagation environment.

Figure 5:
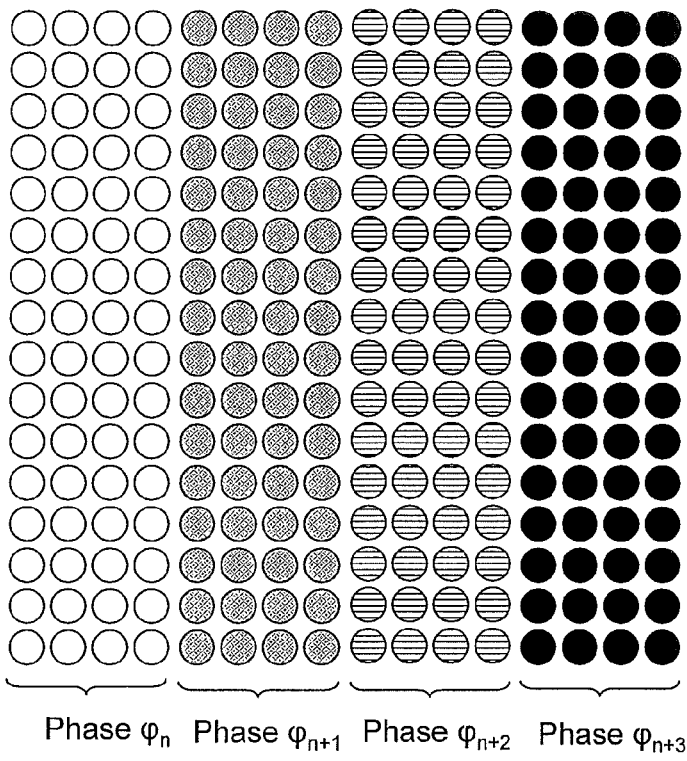
FIG. 5 shows a classical configuration of an ultrasonic transducer.

With reference to FIG. 5, showing the typical configuration of the present capacitive devices, it may be observed that the capacitive cells are arranged in rows and columns so as to form a rectangular element having a dimension along the x-axis much lower than that along the y-axis, hence a number of columns much lower than the number of rows.

Figure 4:
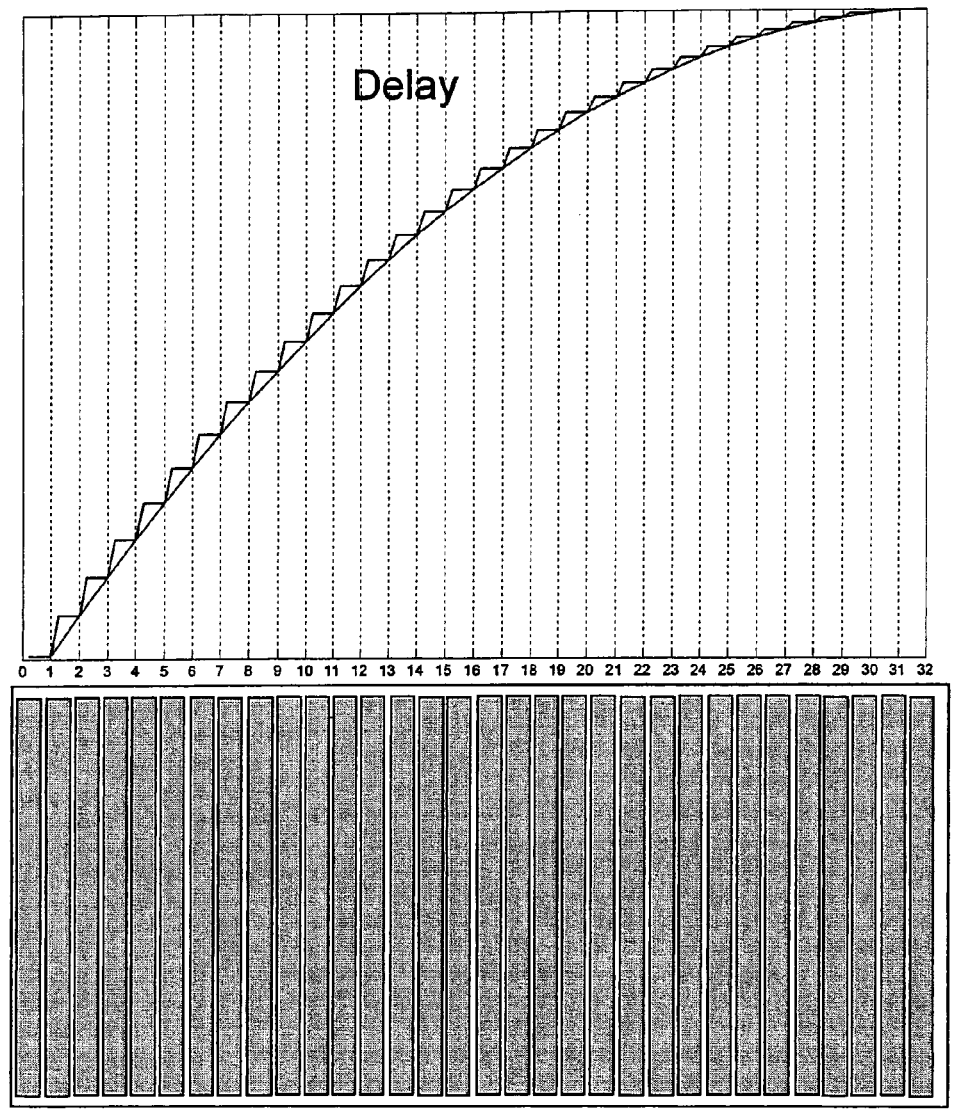
FIG. 4 shows a graph wherein the black curve represents the discretized delay curve, and the dotted one represents the curve obtainable through a physical lens.

Assuming to focus the beam produced by a 64-element transducer of this type at a certain distance z, it is necessary to delay the signals coming from the individual elements so as to make them simultaneously arrive at the desired focal zone. Having 64 rectangular elements, the configuration of the delays to be assigned is that shown in FIG. 4, where the ideal focusing function has been discretized, giving the 64 delays which may be assigned to each element.

Figure 6:
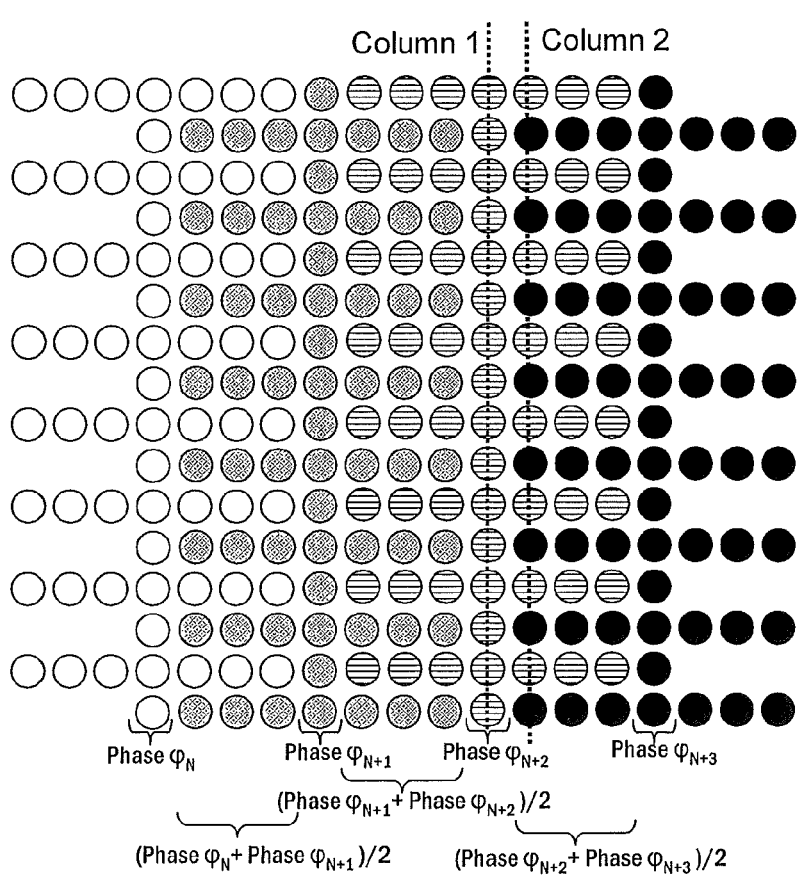
FIG. 6 shows a first embodiment of a ultrasonic transducer according to the invention.

In the configuration shown in FIG. 6, the adjacent elements reciprocally penetrate into each other. In this manner, there are formed columns the cells of which have all the same phase (phase $\phi_N$, phase $\phi_{N+1}$, phase $\phi_{N+2}$, phase $\phi_{N+3}$) and columns wherein cells with different phases (phase $\phi_N$, phase $\phi_{N+1}$; phase $\phi_{N+1}$, phase $\phi_{N+2}$; phase $\phi_{N+2}$, phase $\phi_{N+3}$) alternate with each other. Contributions propagating from them are added giving a resulting pressure having a phase delay that is intermediate between those of the two lateral columns. In short, with this technique virtual elements are inserted among the original array elements (each comprising four columns of cells), which virtual elements are capable to generate an intermediate phase between adjacent elements. In principle, the proposed technique is thus capable to double the number of elements, and hence to halve the ratio d/$\lambda$, still maintaining unchanged the number of needed electronic channels, as well as creating the phase delays.

In adopting this technique, attention must be taken to phases which are created along the axis perpendicular to the one of interest. In fact, new grating lobes could be created in other spatial points due to a non-uniformity of the phase along the y-axis. It is necessary to find the best balance between improvements obtained in the resolution along the x-axis and defects introduced along the y-axis.

Figure 7:
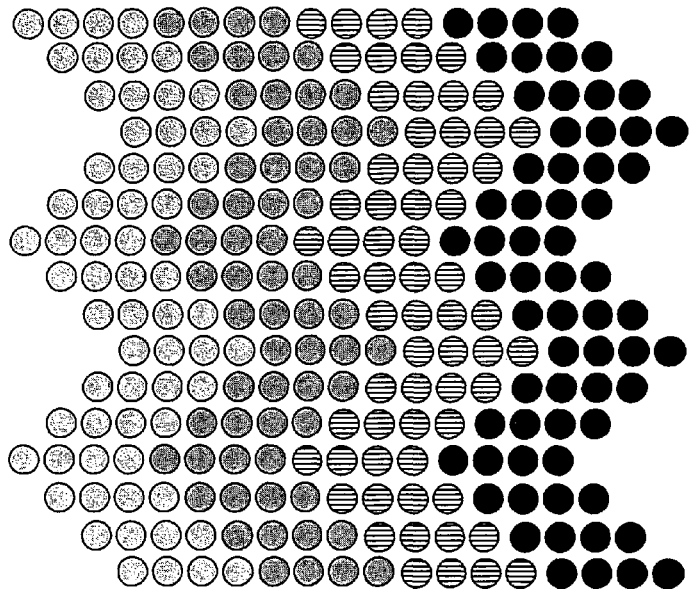
FIG. 7 shows a second embodiment of an ultrasonic transducer according to the invention.
Figure 8:
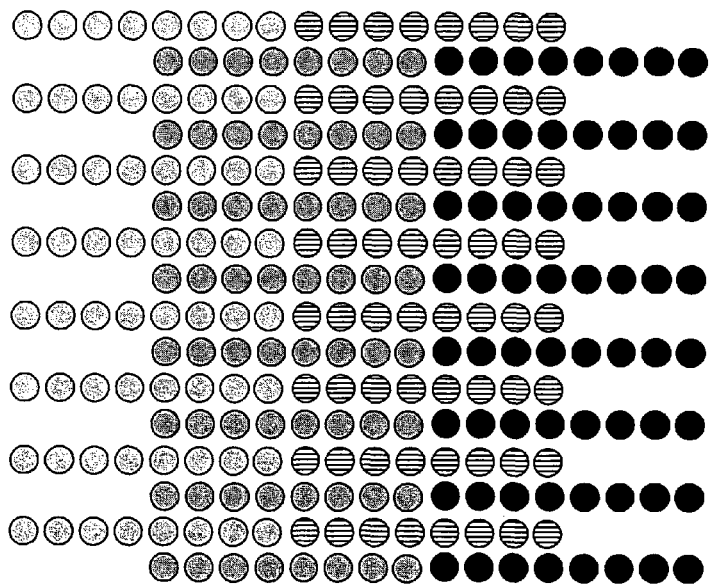
FIG. 8 shows a third embodiment of an ultrasonic transducer according to the invention.

In the following, the classical configuration of FIG. 5, the previously described configuration of FIG. 6, and two other possible configurations, shown in FIGS. 7 and 8, are examined, through computer simulations.

The acoustic fields in the focal plane placed at 5 cm, without deflection $\theta_0$ and with deflection of 15 and 30 degrees, are reported for each configuration.

Results have been obtained under the same conditions, i.e., for all the simulations, under the assumption of having a 64-element array with a total aperture of 12 mm and a length of 0.7 cm. The total number of membranes along the x-axis is equal to 256 and that along the y-axis is equal to 160, the diameter of the membranes is equal to 40 μm and the distance spacing them is equal to 4 μm.

For the sake of comparison, the field related to a classical configuration provided with a double number of elements, i.e. 128, distributed over the same aperture of the other configuration, is also reported.

Figure 9:
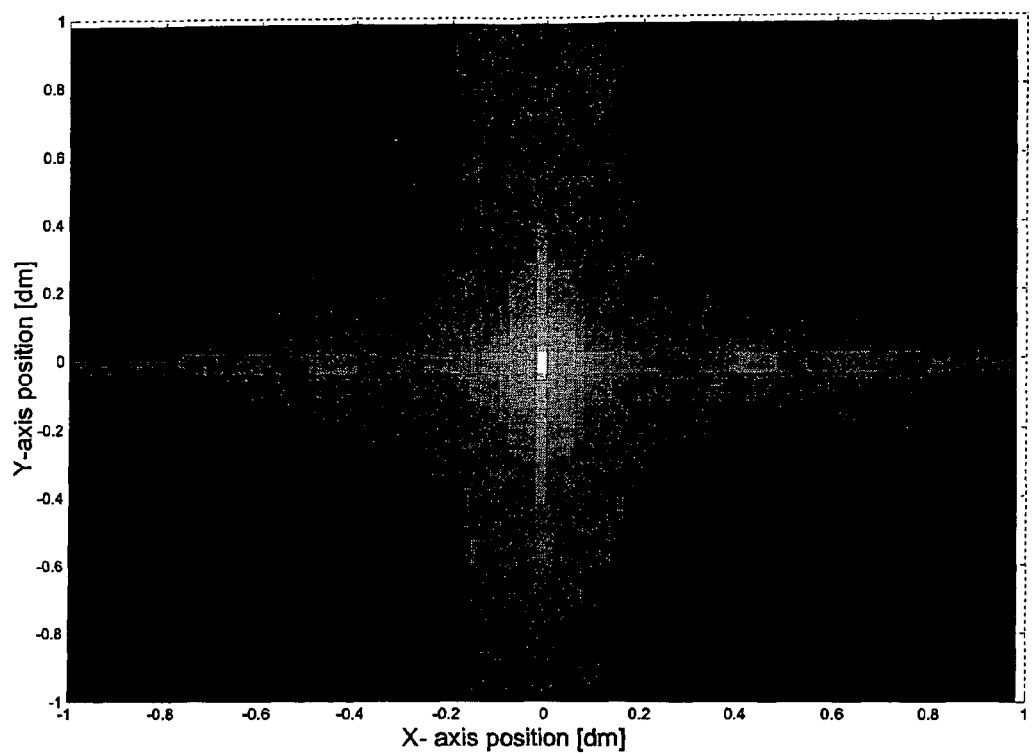
FIG. 9 shows a radiation pattern of the configuration of FIG. 5 in the focal plane z=5 cm, for a ratio d/λ=1.5 without steering.
Figure 15:
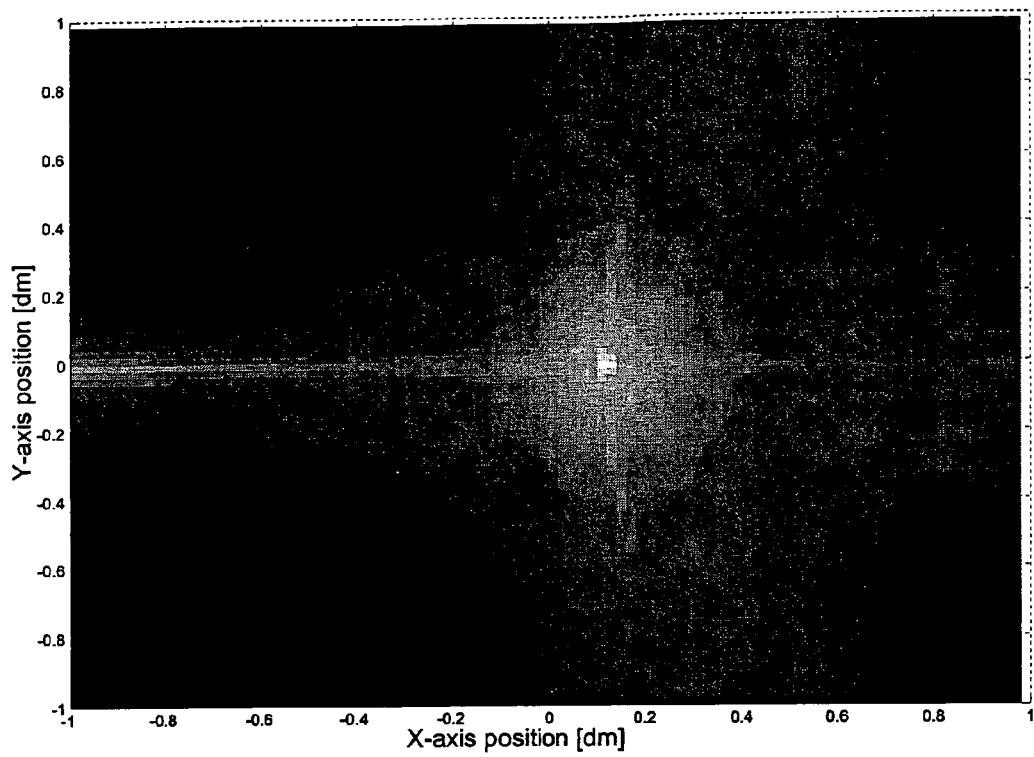
FIG. 15 shows a radiation pattern of the configuration of FIG. 5 in the focal plane z=5 cm, for a ratio d/λ=0.8 and a steering of 15 degrees.
Figure 21:
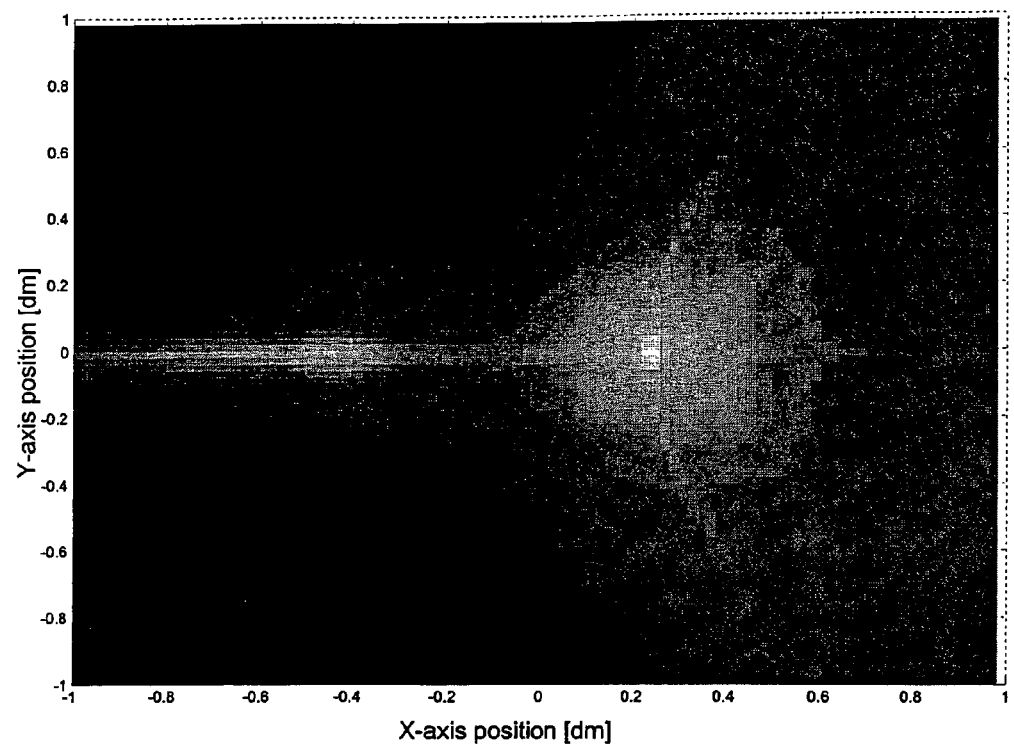
FIG. 21 shows a radiation pattern of the configuration of FIG. 5 in the focal plane z=5 cm, for a ratio d/λ=0.8 and a steering of 30 degrees.

The first configuration under consideration is the previously described one (see FIG. 5). For it, as well as for the other ones, the pressure field at the focal plane has been examined when it is at a distance of 5 cm, the ratio d/$\lambda$ is 1.5 (FIG. 9), and there is no beam deflection, as well as in the case when the ratio d/$\lambda$ is 0.8 and acoustic beam deflections of 15 and 30 degrees (FIGS. 15 and 21, respectively) are carried out.

Figure 10:
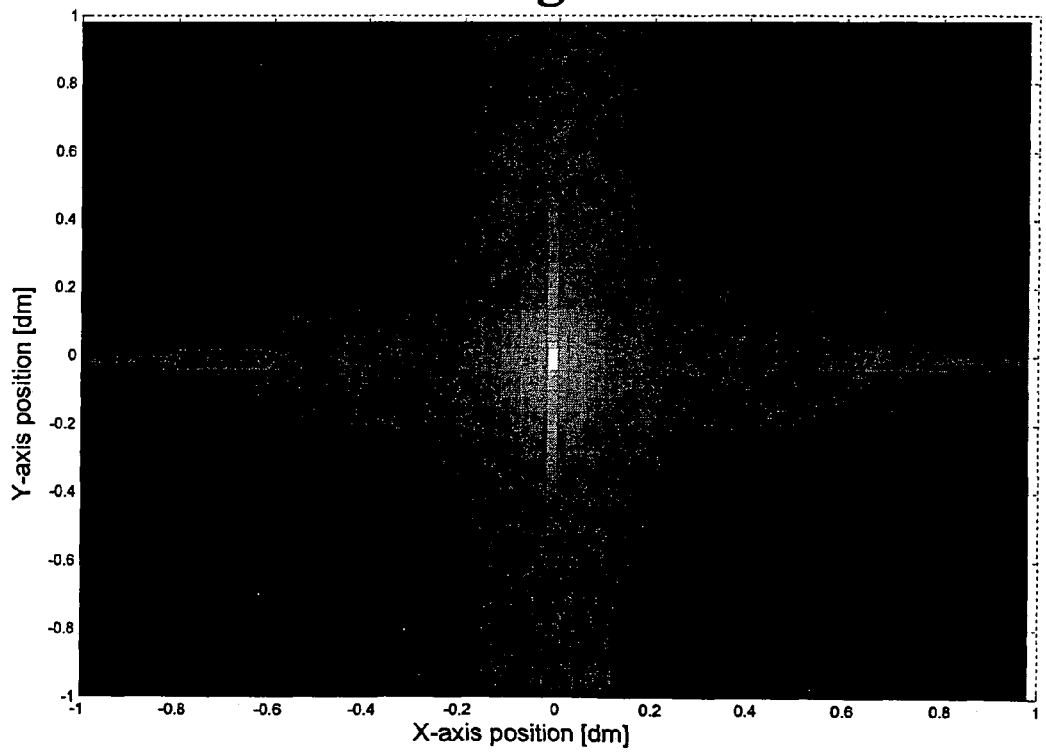
FIG. 10 shows a radiation pattern of the configuration of FIG. 6 in the focal plane z=5 cm, for a ratio d/λ=1.5 without steering.
Figure 16:
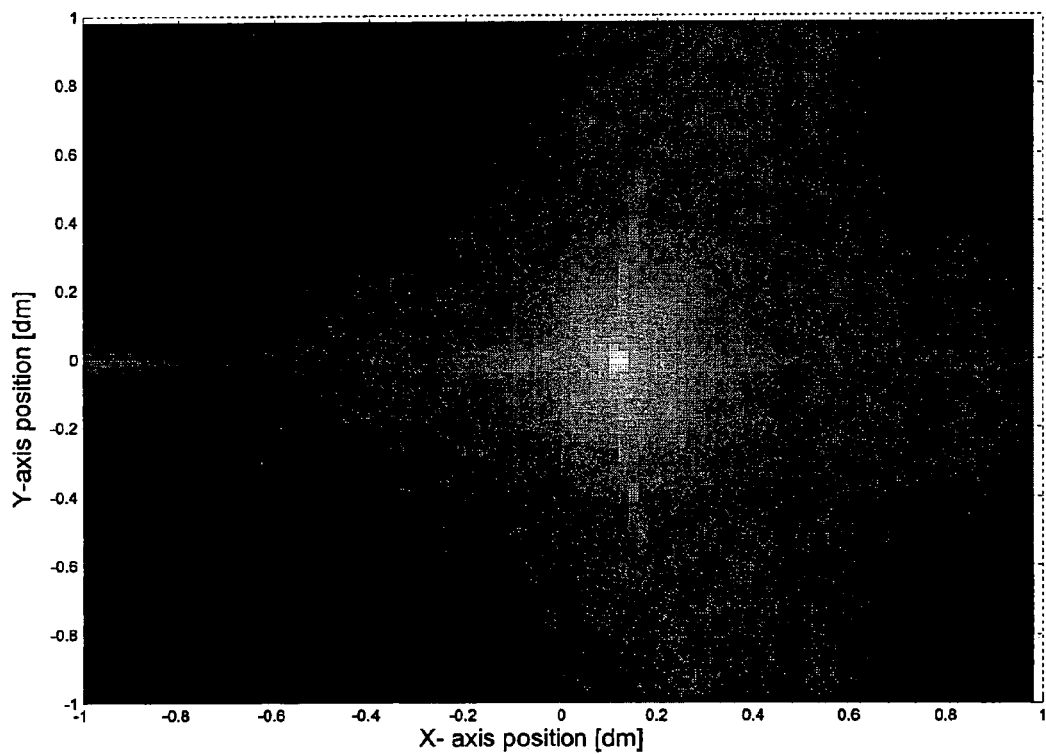
FIG. 16 shows a radiation pattern of the configuration of FIG. 6 in the focal plane z=5 cm, for a ratio d/λ=0.8 and a steering of 15 degrees.
Figure 22:
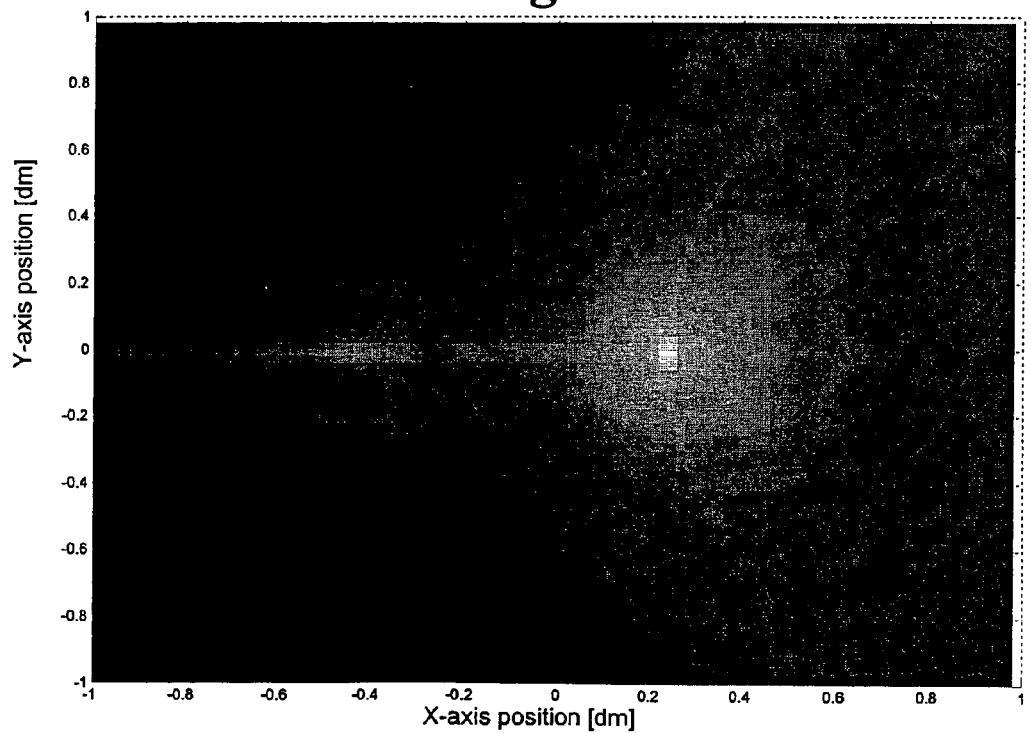
FIG. 22 shows a radiation pattern of the configuration of FIG. 6 in the focal plane z=5 cm, for a ratio d/λ=0.8 and a steering of 30 degrees.

Configuration 2, see FIG. 6, offers a sharp decrease of the side lobes both with beam deflection (FIG. 16 for 15 degrees and FIG. 22 for 30 degrees) and without it (FIG. 10). The decrease of the side lobes is rather considerable being about 10 dB in the case when the beam is deflected and about 6-7 dB when not.

Figure 11:
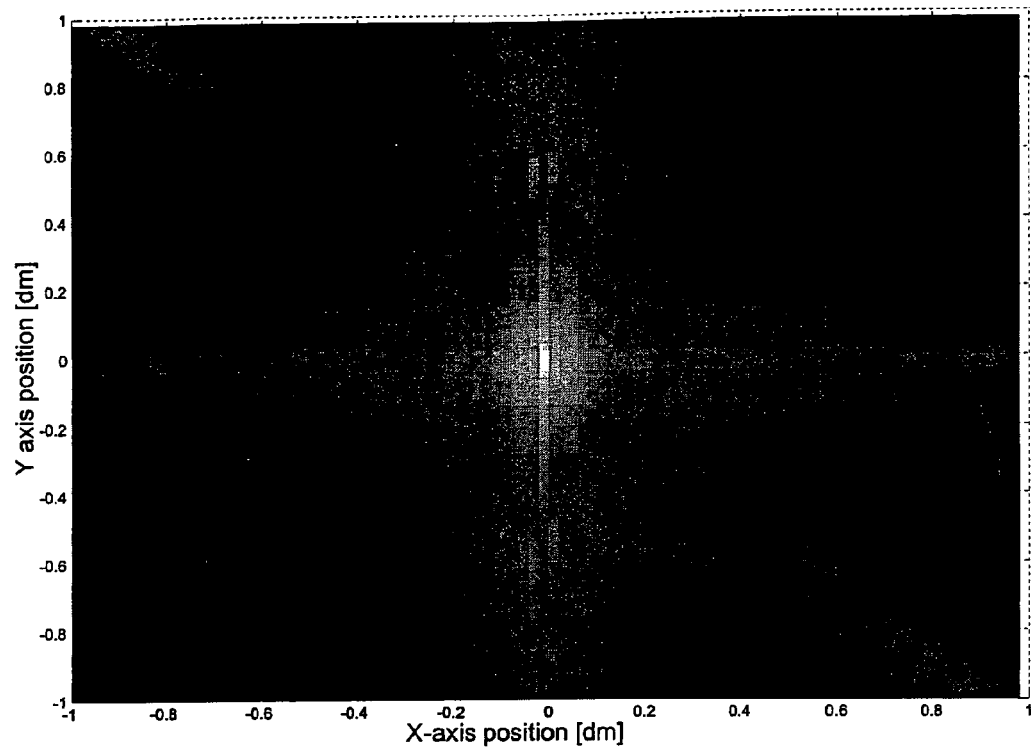
FIG. 11 shows a radiation pattern of the configuration of FIG. 7 in the focal plane z=5 cm, for a ratio d/λ=1.5 without steering.
Figure 12:
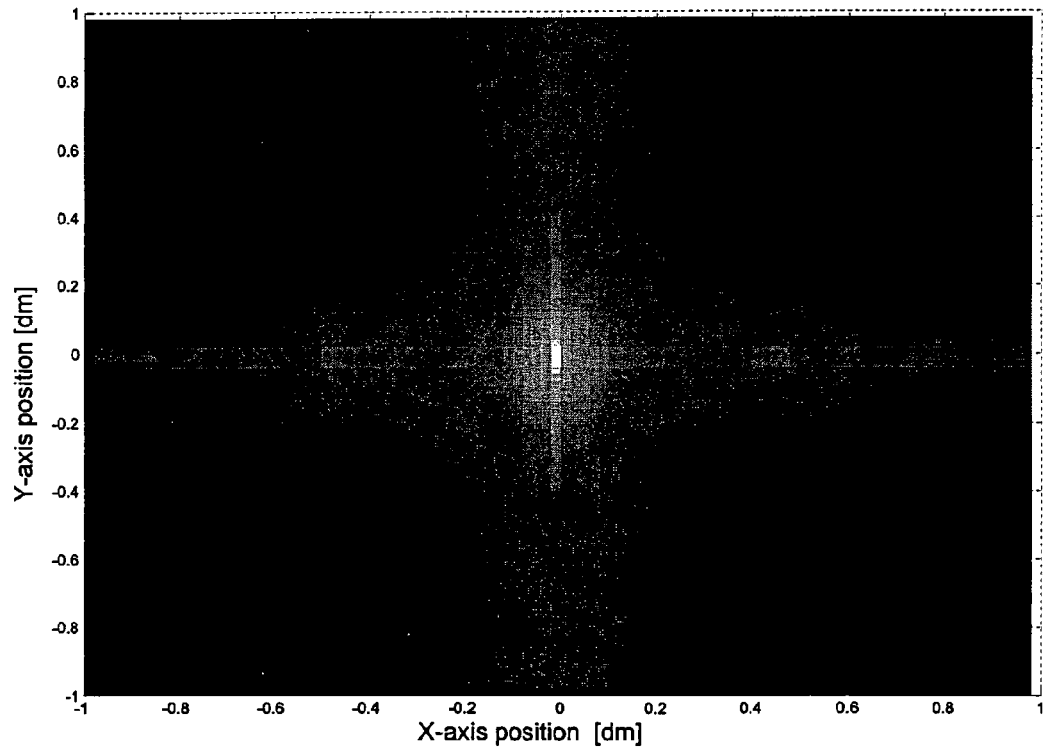
FIG. 12 shows a radiation pattern of the configuration of FIG. 8 in the focal plane z=5 cm, for a ratio d/λ=1.5 without steering.
Figure 17:
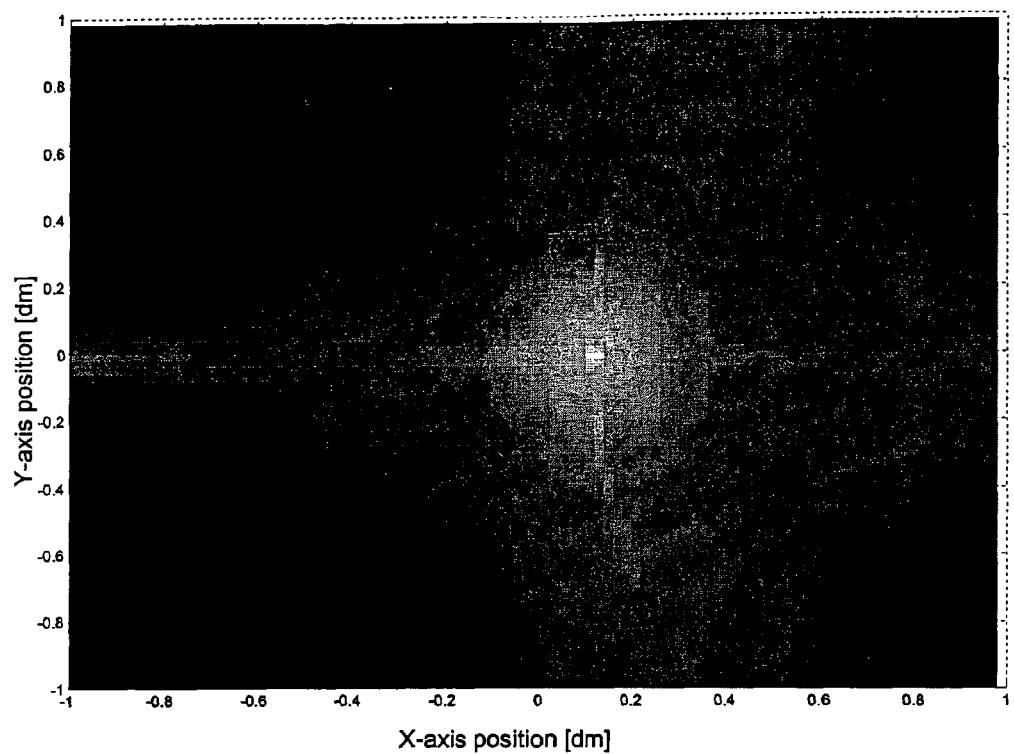
FIG. 17 shows a radiation pattern of the configuration of FIG. 7 in the focal plane z=5 cm, for a ratio d/λ=0.8 and a steering of 15 degrees.
Figure 23:
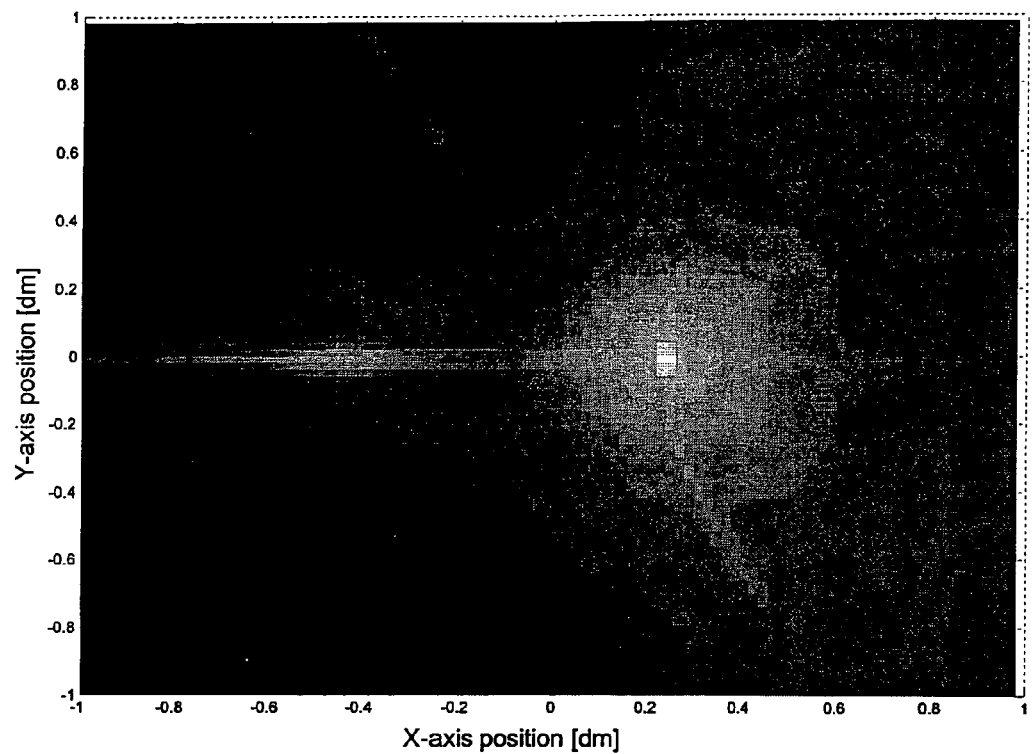
FIG. 23 shows a radiation pattern of the configuration of FIG. 7 in the focal plane z=5 cm, for a ratio d/λ=0.8 and a steering of 30 degrees.

Configuration 3, see FIG. 7, causes the creation of lobes in a direction oblique to the transducer. These lobes, which are very evident in the case when no steering is carried out (see FIG. 11), may be more detrimental than the grating lobe. In case of steering (see FIGS. 17 and 23), although the situation has been clearly improved, the presence of lobes which are oblique to the transducer deletes any possible advantage due to the reduction of the side lobes.

Figure 18:
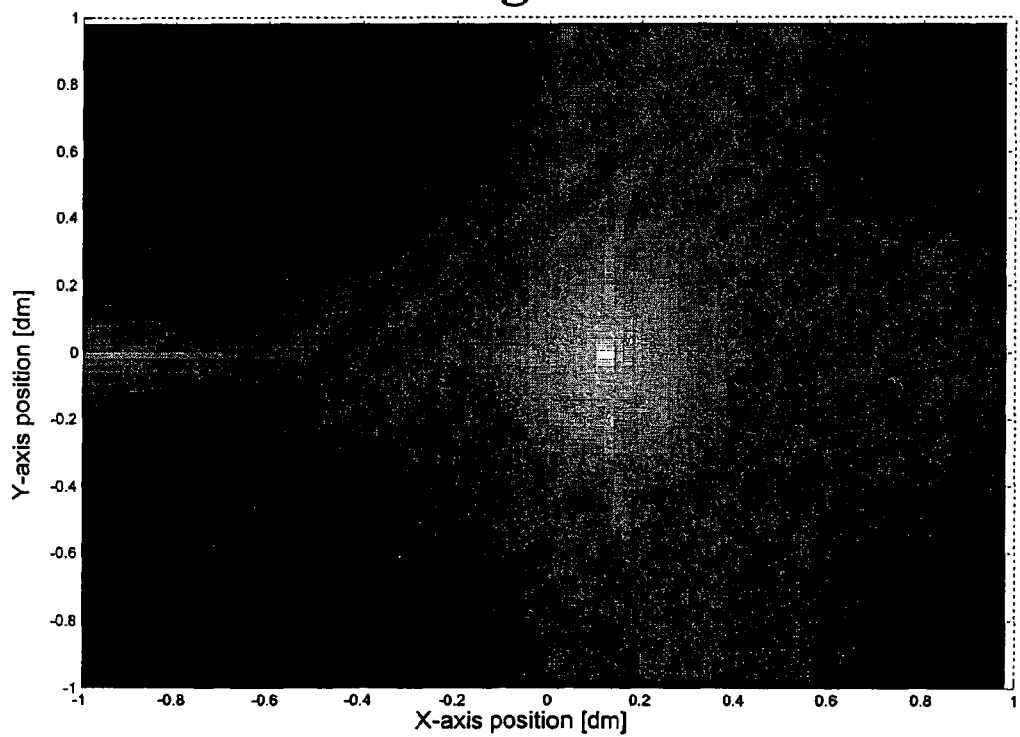
FIG. 18 shows a radiation pattern of the configuration of FIG. 8 in the focal plane z=5 cm, for a ratio d/λ=0.8 and a steering of 15 degrees.
Figure 24:
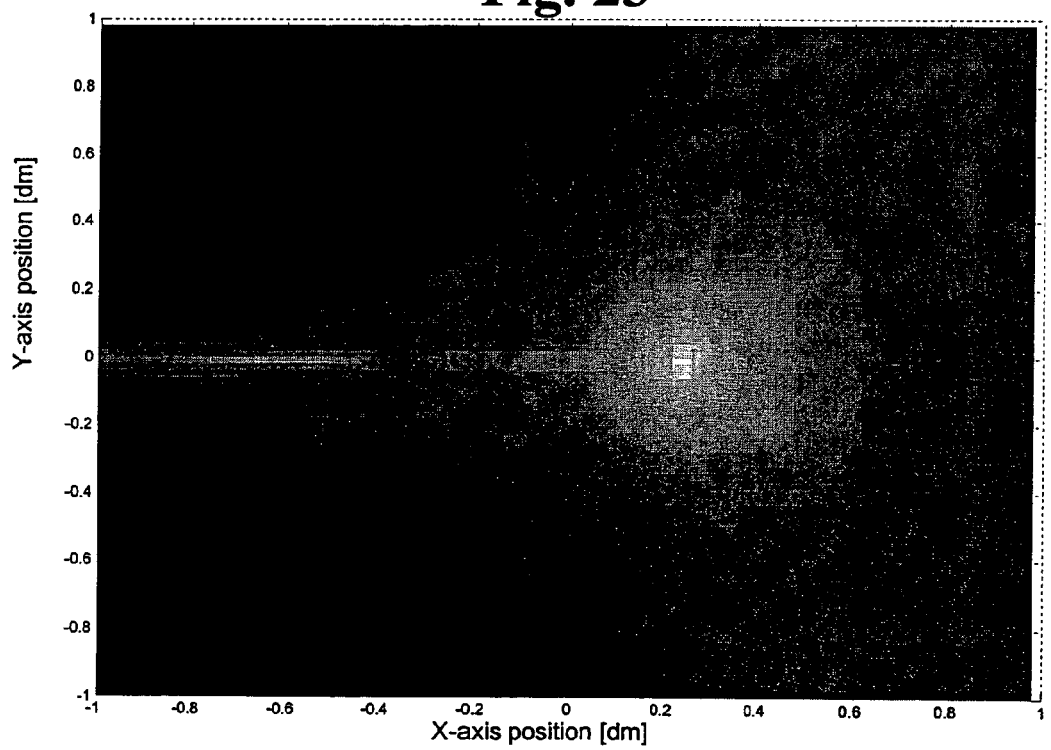
FIG. 24 shows a radiation pattern of the configuration of FIG. 8 in the focal plane z=5 cm, for a ratio d/λ=0.8 and a steering of 30 degrees.

Configuration 4 (see FIG. 8) operates as configuration 1 when there is no steering (FIG. 13), thus not offering particular advantages. However, it offers a good decrease of the grating lobes in the case when a beam deflection is carried out (FIGS. 18 and 24).

Figure 13:
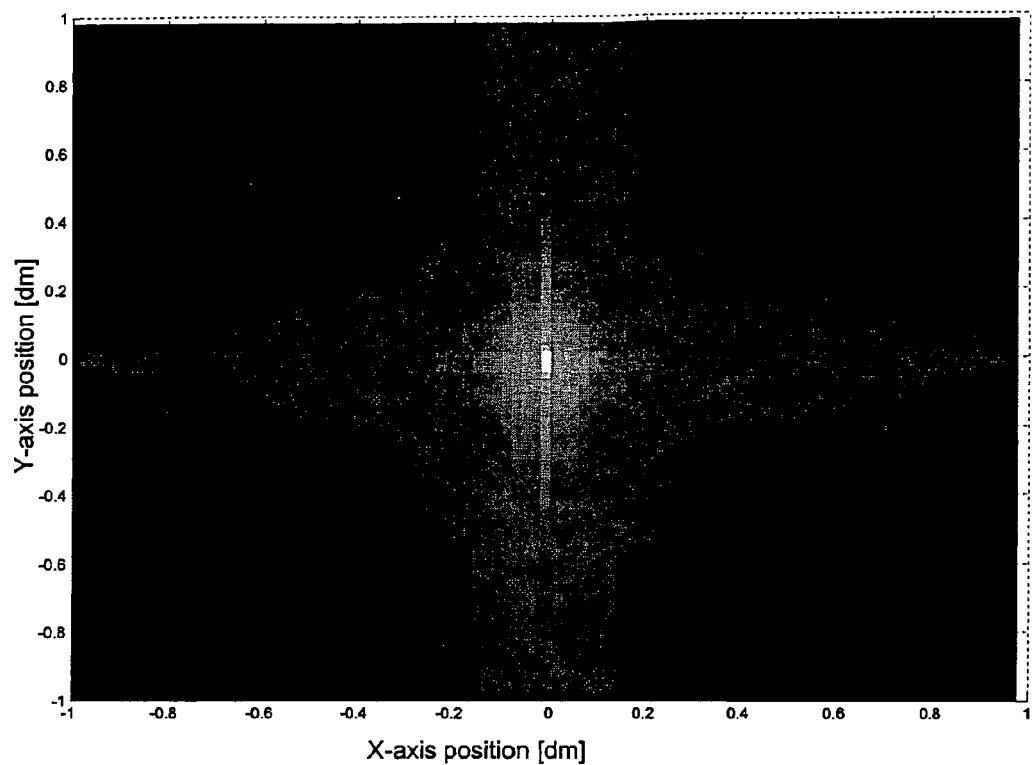
FIG. 13 shows a radiation pattern of the classical configuration, with 128 elements, in the focal plane z=5 cm, for a ratio d/λ=1.5 without steering.
Figure 19:
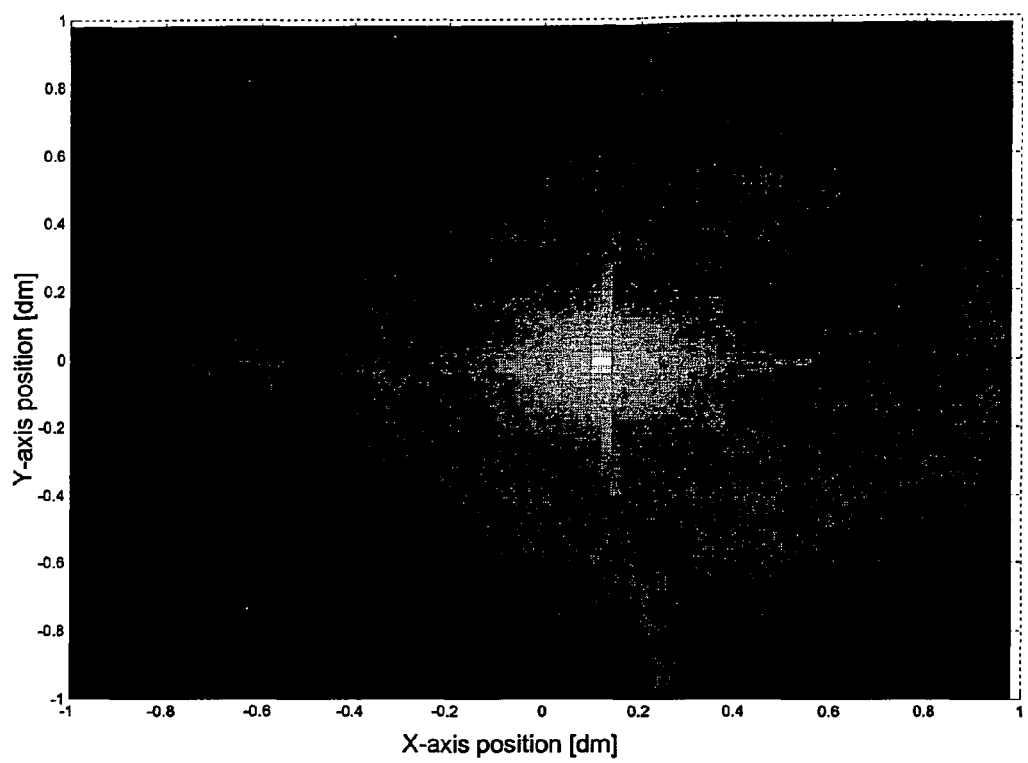
FIG. 19 shows a radiation pattern of the classical configuration, with 128 elements, in the focal plane z=5 cm, for a ratio d/λ=0.8 and a steering of 15 degrees.
Figure 25:
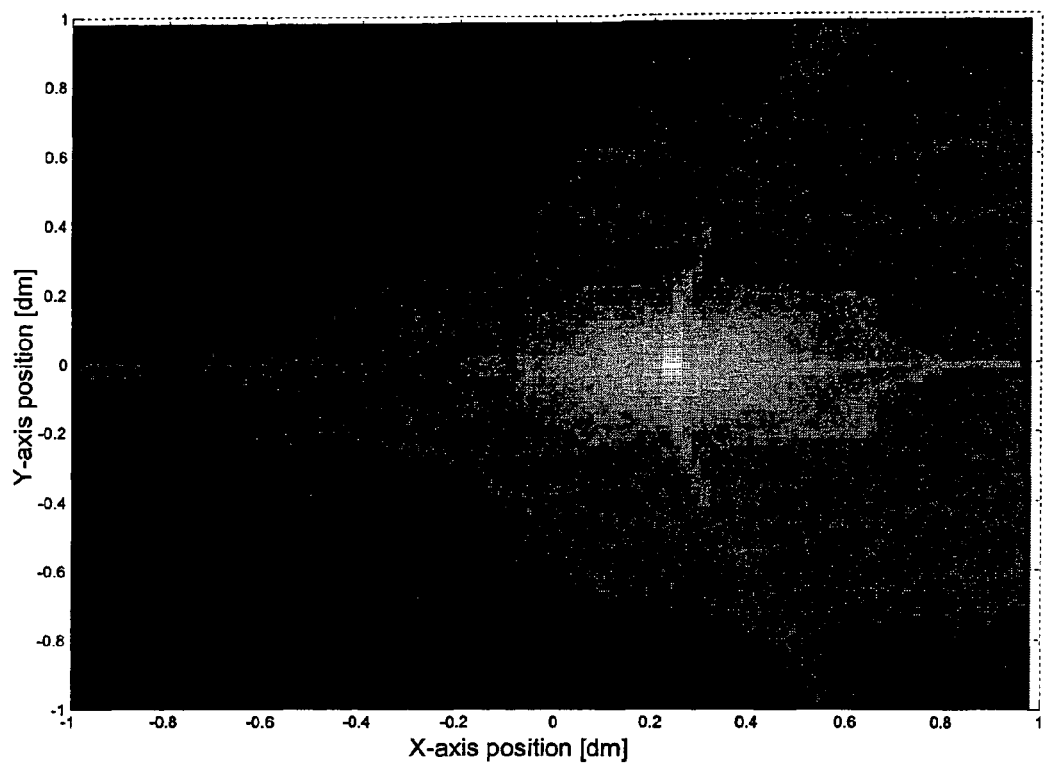
FIG. 25 shows a radiation pattern of the classical configuration, with 128 elements, in the focal plane z=5 cm, for a ratio d/λ=0.8 and a steering of 30 degrees.

FIGS. 13, 19 and 25 report simulations in case of the 128-element configuration.

Figure 14:
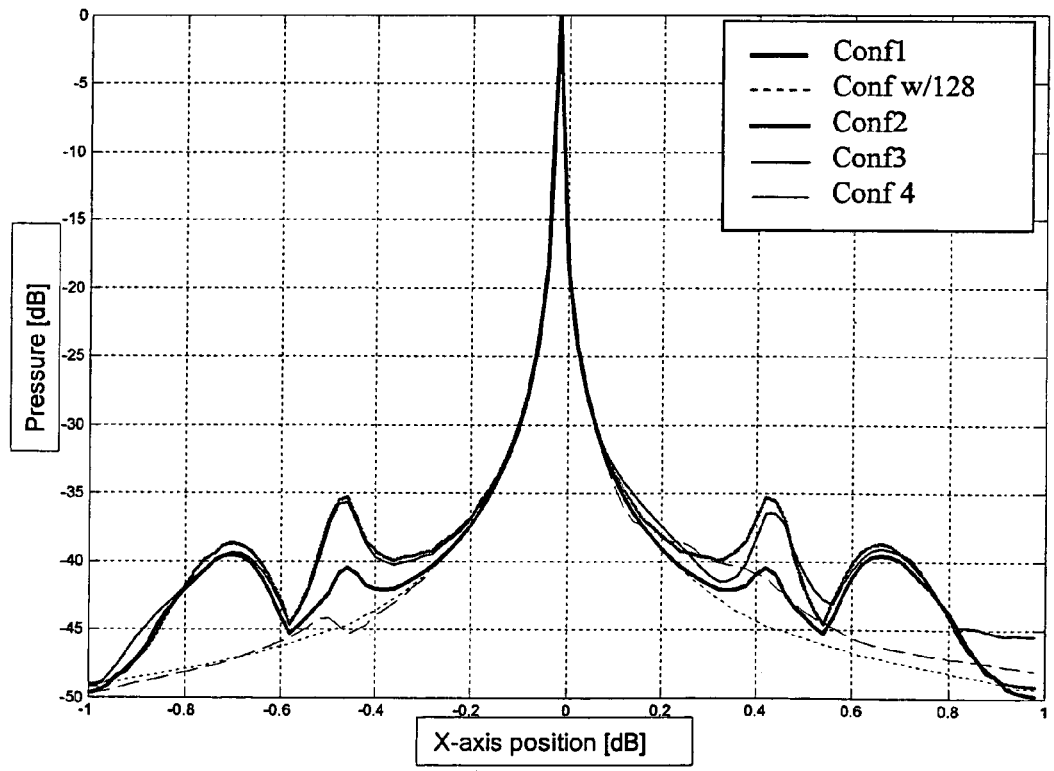
FIG. 14 shows radiation patterns of the considered configurations in the focal plane z=5 cm and y=0, for a ratio d/λ=1.5 without steering.
Figure 20:
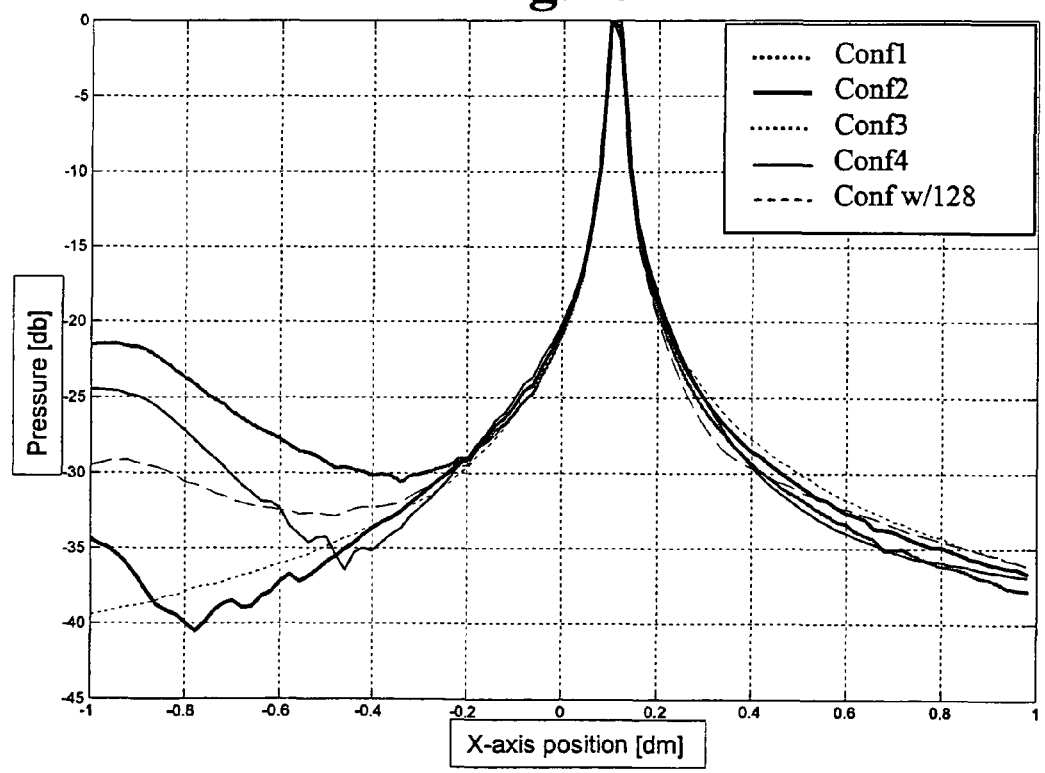
FIG. 20 shows radiation patterns of the considered configurations in the focal plane z=5 cm and y=0, for a ratio d/λ=0.8 and a steering of 15 degrees.
Figure 26:
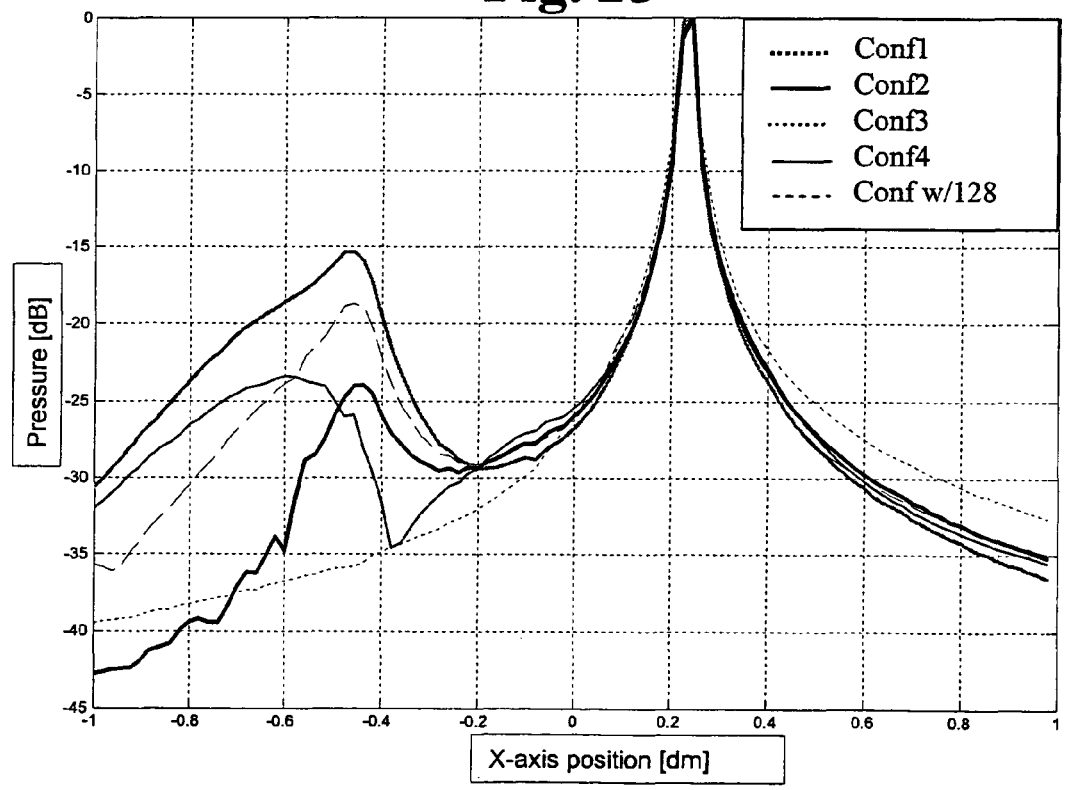
FIG. 26 shows radiation patterns of the considered configurations in the focal plane z=5 cm and y=0, for a ratio d/λ=0.8 and a steering of 30 degrees.

For the sake of clarity, FIGS. 14, 20 and 26 report the radiation patterns at the focus for y=0. From such graphs, it may be observed that, in all the examined cases, configuration 2 is the one offering the best results in terms of reduction of the side lobes; moreover, as seen above, it does not cause significant defects in directions which are oblique to the transducer.

The interdigitated geometry above may be also applied to piezoelectric array made of composite in the case when the piezoelectric phase has side dimensions sufficiently lower than the wavelength.

The preferred embodiments have been above described and some modifications of this invention have been suggested, but it should be understood that those skilled in the art can make other variations and changes, without so departing from the related scope of protection, as defined by the following claims.

The invention claimed is:

1. Ultrasonic transducer comprising:
a plurality of micro-cells, arranged in an array having M rows and N columns; and
driving electronic means connecting said micro-cells such that at least two sub-groups of said micro-cells having different respective phases are formed,
wherein the micro-cells of a first sub-group from the at least two sub-groups are connected in parallel to be in phase with each other, and the micro-cells of a second sub-group from the at least two sub-groups are connected in parallel to be in phase with each other, and
wherein at least one column of said array comprises micro-cells belonging to at least two different adjacent sub-groups so that a radiation emitted in a direction perpendicular to the array columns, by said at least one column, has a phase that is intermediate between the phases of said at least two different adjacent sub-groups.

2. Transducer according to claim 1, wherein at least one sub-group comprises at least one column of said micro-cells.

3. Transducer according to claim 1, wherein said at least one column comprises a sequence of micro-cells in alternate rows belonging to two different adjacent sub-groups.

4. Transducer according to claim 1, wherein said array includes two or more columns, which are intermediate the first sub-group and the second sub-group different from and adjacent to each other, said two or more intermediate columns comprising micro-cells belonging to the first and to the second sub-group, so that the number of micro-cells belonging to the first sub-group in said two or more columns gradually decreases passing from the first sub-group to the second sub-group.

5. Transducer according to claim 1, wherein at least one incomplete column of said array comprises a number of micro-cells less than M.

6. Transducer according to claim 5, wherein said at least one incomplete column is placed at an end of said array.

7. Transducer according to claim 1, wherein the number N of columns of said array is an involution of 2 ($N=2^n$).

8. Transducer according to claim 1, wherein said driving electronic means connecting said micro-cells in parallel is at least partially controlled by an external logic unit.

9. Transducer according to claim 1, wherein said driving electronic means dynamically connects said micro-cells in parallel, so that said at least two sub-groups of said micro-cells have a composition variable in time.

10. Transducer according to claim 1, wherein said driving electronic means connecting said micro-cells in parallel is at least partially predefined.

11. Transducer according to claim 1, wherein said driving electronic connecting said micro-cells in parallel comprises short-circuited electrical connections.

12. Transducer according to claim 1, wherein said driving electronic means connects said micro-cells in parallel such that at least three sub-groups of said micro-cells are formed.

13. Transducer according to claim 1, wherein said plurality of said micro-cells comprises one or more CMUT cells.

14. Transducer according to claim 1, wherein said plurality of said micro-cells comprises one or more piezoelectric cells.

* * * * *